(12) United States Patent
    Courbis

(10) Patent No.: US 10,302,226 B2
(45) Date of Patent: May 28, 2019

(54) DEVICE DESIGNED TO ATTACH AT LEAST ONE CABLE ALONG A PIPE, AND METHOD OF IMPLEMENTING SUCH A DEVICE

(71) Applicant: Financiere de Beaumont—FBD, Romans (FR)

(72) Inventor: Hervé Courbis, Romans sur Isere (FR)

(73) Assignee: Financiere de Beaumont—FBD, Romans (FR)

( * ) Notice: Subject to any disclaimer, the term of this patent is extended or adjusted under 35 U.S.C. 154(b) by 0 days.

(21) Appl. No.: 15/822,151

(22) Filed: Nov. 26, 2017

(65) Prior Publication Data

US 2018/0149290 A1     May 31, 2018

(30) Foreign Application Priority Data

Nov. 28, 2016    (FR) ...................................... 16 61604

(51) Int. Cl.
    *F16L 3/08*    (2006.01)
    *F16L 1/20*    (2006.01)
    (Continued)

(52) U.S. Cl.
    CPC    *F16L 3/08* (2013.01); *F16L 1/20* (2013.01); *F16L 3/06* (2013.01); *F16L 3/137* (2013.01);
    (Continued)

(58) Field of Classification Search
    USPC ............ 248/65, 73, 74.1, 74.2, 74.3, 228.7, 248/228.8, 230.7, 230.8, 231.81, 316.7;
    (Continued)

(56) References Cited

U.S. PATENT DOCUMENTS 3,632,069 A *  1/1972  Thayer .................... F16L 3/233
                                                    248/56
7,784,743 B2 *  8/2010  Zeuner .................... H02G 3/30
                                                    248/63

(Continued)

FOREIGN PATENT DOCUMENTS

DE        29900202      7/1999
EP         0021597      1/1981
WO    WO 2013/060962    5/2013

OTHER PUBLICATIONS

Rapport de Recherche Préliminaire et Opinion Ecrite [Preliminary Search Report and the Written Opinion] dated Jul. 11, 2017 From the Institut National de la Propriété Industrielle, INPI de la République Française Re. Application No. FR 1661604. (6 Pages).

*Primary Examiner* — Alfred J Wujciak

(57) ABSTRACT

The present invention concerns a device (1) designed to attach at least one cable (2) along a pipe (3), the device (1) comprising: a base (10) constituting a part of maximum height (H10) of the device (1); a channel (20) that extends along a longitudinal axis (X1) on an upper side of the device (1) and which is intended to receive the cable (2); a support surface (30) which is formed on a lower side of the device (1) and which is intended to rest against the pipe (3); two jaws which are formed protruding from the base (10) on the upper side, which border the channel (20) on either side of the longitudinal axis (X1) and which constitute a clamp (12) provided to grip the cable (2); and a transverse passage (40) which is formed through the base (10), between the channel (20) and the support surface (30), and which is intended to receive an attachment member (4) to press the device (1) against the pipe (3); characterized in that the device (1) comprises a longitudinal extension (50) prolonging the base (10), more elongated than the base (10) and having a height (Continued)

(H50) decreasing overall moving away from the base (10) along the longitudinal axis (X1).

10 Claims, 4 Drawing Sheets

(51) Int. Cl.
    *F16L 3/06*     (2006.01)
    *F16L 3/137*     (2006.01)
    *H02G 3/32*     (2006.01)
    *H02G 9/12*     (2006.01)
    *B63B 35/04*     (2006.01)

(52) U.S. Cl.
    CPC ................ *H02G 3/32* (2013.01); *H02G 9/12*
              (2013.01); *B63B 35/04* (2013.01)

(58) Field of Classification Search
    USPC .................................................... 285/422, 61
    See application file for complete search history.

(56) References Cited

U.S. PATENT DOCUMENTS

| | | | | |
|---|---|---|---|---|
| 7,854,414 | B2* | 12/2010 | Head | F16L 3/233 |
| | | | | 24/20 R |
| 8,431,823 | B2* | 4/2013 | Du | H02G 1/00 |
| | | | | 174/135 |
| 2002/0104931 | A1* | 8/2002 | Mascadri | F16L 3/233 |
| | | | | 248/74.3 |
| 2003/0116683 | A1* | 6/2003 | Turner | F16L 3/1041 |
| | | | | 248/65 |
| 2007/0209804 | A1 | 9/2007 | Webre et al. | |
| 2010/0096511 | A1* | 4/2010 | Olver | F16L 3/137 |
| | | | | 248/65 |
| 2011/0006512 | A1 | 1/2011 | James et al. | |
| 2011/0126934 | A1* | 6/2011 | Thuesen | F16L 3/1025 |
| | | | | 138/106 |
| 2012/0217354 | A1* | 8/2012 | Walraven | F16L 3/1025 |
| | | | | 248/74.1 |
| 2013/0068899 | A1* | 3/2013 | Richter | H02G 3/32 |
| | | | | 248/65 |

\* cited by examiner

DEVICE DESIGNED TO ATTACH AT LEAST ONE CABLE ALONG A PIPE, AND METHOD OF IMPLEMENTING SUCH A DEVICE

RELATED APPLICATION

This application claims the benefit of priority of French Patent Application No. 1661604 filed Nov. 28, 2016, the contents of which are incorporated herein by reference in their entirety.

FIELD AND BACKGROUND OF THE INVENTION

The present invention relates to a device designed to attach at least one cable along a pipe. The device also relates to a method of implementing such a device.

The domain of the invention is that of pipes, such as pipelines for the transport of hydrocarbons. Such pipes can extend over several hundred kilometers, on land, underground and/or underwater.

In this domain, it is known to attach various elements along pipes, such as electrical cables or systems of sensors. These elements must remain in place throughout the life of the pipe, for example 25 years. When the pipe is immersed, these elements must withstand pressures, temperature variations, currents, submarine flora and fauna, etc.

To attach the cables to the pipe, it is known to position support devices along the pipe in the open air, for example on a ship. Each device is secured to the pipe by means of an attachment member such as a strap or clamping collar.

WO2013060962A1 describes an example of a support device developed by the Applicant. The device is composed of two parts, namely a base and a swinging locking lever. Once secured to the pipe, the base receives the cable then the cable is locked in position with the locking lever. Preferably, the base is of polyurethane elastomer, as known under the Applicant's brand COURBHANE.

To lay the pipe, for example to guide the pipe off the ship, it is known to implement motorized drive means, for example pressure rollers. The rollers are positioned beneath the pipe when the pipe is guided horizontally or on either side of the pipe when it is guided vertically. The rotation of the rollers, pressed against the pipe, causes the movement thereof.

The greater the dimensions of the pipe, the greater the dimensions of the rollers and the greater the drive forces on the pipe. In some cases, the thrust of the rollers on the support device causes the attachment member to break and the device to be torn off.

SUMMARY OF THE INVENTION

The aim of the present invention is to propose a support device suitable for all types of pipes, including those that must be laid with a high degree of drive forces.

To that end, the object of the invention is a device designed to attach at least one cable along a pipe, the device comprising:
- a base constituting a part of maximum height of the device;
- a channel that extends along a longitudinal axis on an upper side of the device and which is intended to receive the cable;
- a support surface which is formed on a lower side of the device and which is intended to rest against the pipe;
- two jaws which are formed protruding from the base on the upper side, which border the channel on either side of the longitudinal axis and which constitute a clamp provided to grip the cable; and
- a transverse passage which is formed through the base, between the channel and the support surface, and which is intended to receive an attachment member to press the device against the pipe;

The device is characterized in that it comprises a longitudinal extension prolonging the base, more elongated than the base, and having a height decreasing overall moving away from the base along the longitudinal axis.

Thus, with the invention the detachment of the device can be avoided when it passes beneath the drive rollers, including when said rollers exert high drive forces on the pipe and the device. The rollers progressively flatten the longitudinal extension, then the base, without breaking the attachment member and pulling off the device.

According to other advantageous characteristics of the invention, taken in isolation or in combination:
- The longitudinal extension is intended to receive a second member for attachment of the device against the pipe.
- The longitudinal extension comprises a transverse groove which is intended to receive a second member for attachment of the device against the pipe.
- The longitudinal extension comprises a first portion which has a constant height and a second portion having a height decreasing overall moving away from the base along the longitudinal axis.
- The longitudinal extension has a length at least twice that of the length of the base.
- The channel extends from the upper side of the device all along the base and partially along the longitudinal extension.
- A sloped ramp is formed on the upper side of the device, between the base and the longitudinal extension, on either side of the channel.
- A second longitudinal extension prolongs the base opposite the longitudinal extension and has a height decreasing overall moving away from the base along the longitudinal axis.
- A mounting plate is formed that transversely extends past either side of the base and partly defines the support surface.
- The device is cross-shaped comprising a foot composed of the longitudinal extension, a tip composed of the second longitudinal extension and two lateral branches composed of the mounting plate.
- The device is attached to the pipe by two attachment members spaced apart.

An object of the invention is also a method of implementing a device such as mentioned above. The method is characterized in that it comprises the following steps:
a) the device is attached to the pipe, using at least one attachment member; then
b) drive means progressively move the pipe along a first direction parallel to the longitudinal axis of the device, pressing successively on the pipe, the longitudinal extension and the base, then again on the pipe.

BRIEF DESCRIPTION OF THE SEVERAL VIEWS OF THE DRAWINGS

The invention will be better understood upon reading the following description, given solely as a non-limiting example, and made with reference to the accompanying figures wherein.

DESCRIPTION OF SPECIFIC EMBODIMENTS OF THE INVENTION

A support device 1 according to the invention is represented in FIGS. 1 to 6.

Figure 1:
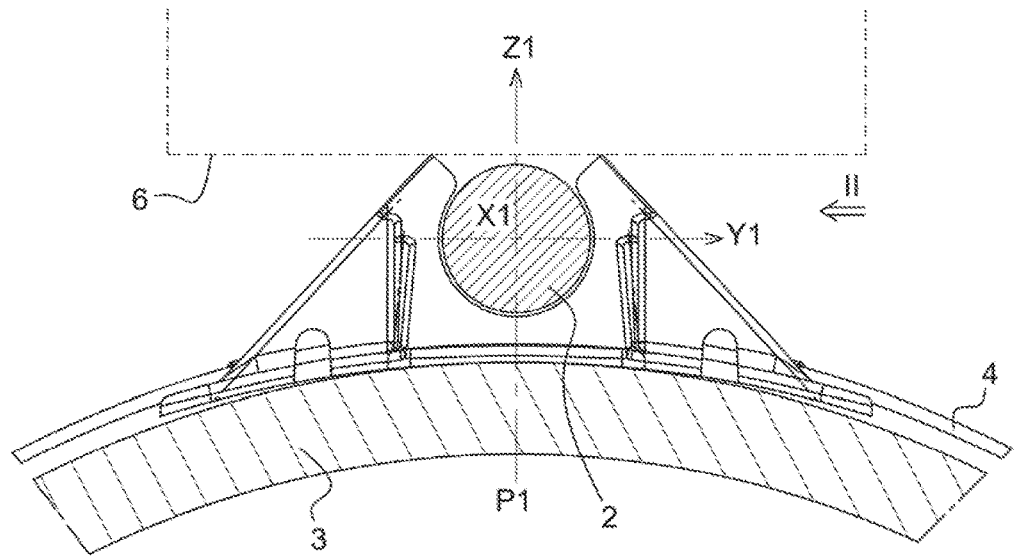
FIG. 1 is a transverse section of a pipe equipped with a device according to the invention, supporting a cable and held in position by two straps.
Figure 2:
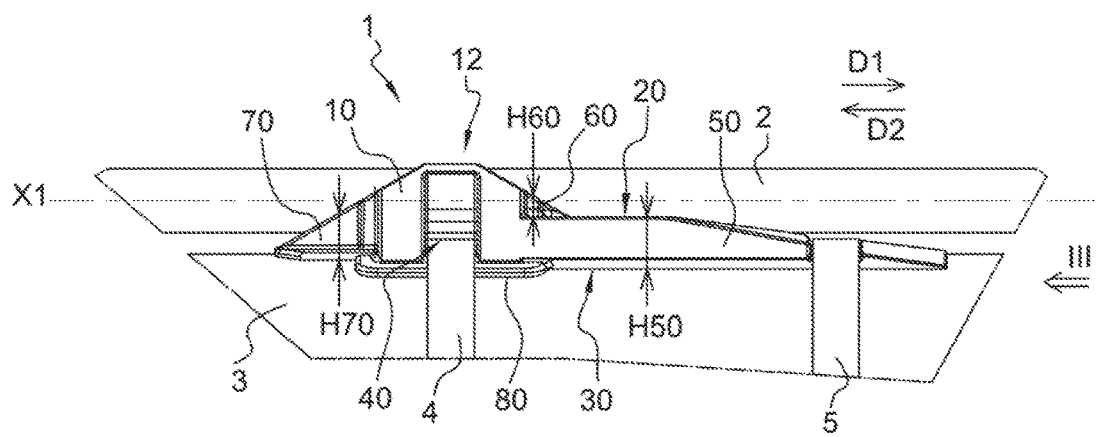
FIG. 2 is a side view along the arrow II in FIG. 1.
Figure 3:
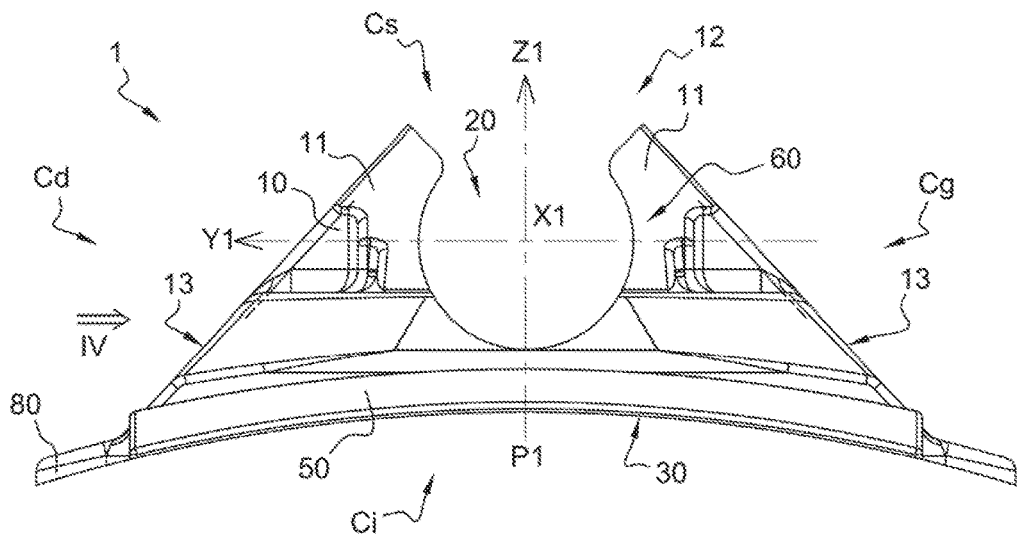
FIG. 3 is a front view of the device, along arrow III in FIG. 2.
Figure 4:
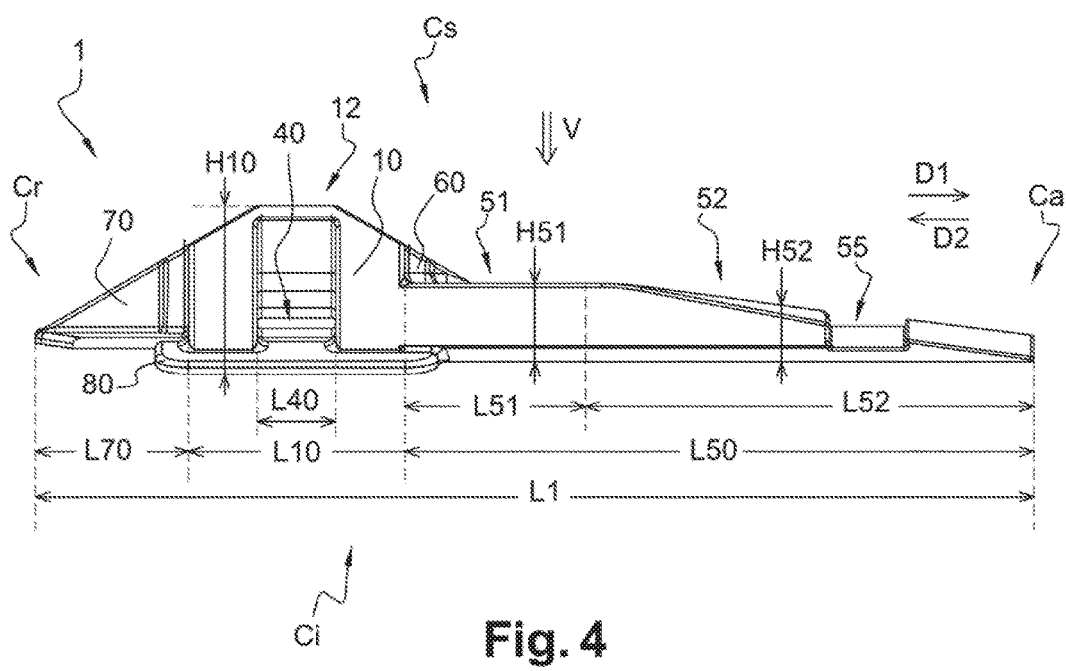
FIG. 4 is a side view of the device, along arrow IV in FIG. 3.

In FIGS. 1 and 2, the device 1 is shown in service, providing the function of positioning a cable 2 along a pipe 3. The device 1 is anchored to the pipe 3 by means of two straps 4 and 5. More specifically, the straps 4 and 5 enable the device 1 to be installed on the pipe 3 in the open air, then to hold the device 1 in support position against the pipe 3 when said pipe is in-service, installed on the ground, underground or underwater. By way of non-limiting example, the cable 2 has a diameter on the order of 44 mm, the pipe 3 has a diameter on the order of 700 mm, while the straps 4 and 5 have a width on the order of 32 mm.

Drive means 6, for example motorized rollers, are used to move the pipe 3 along a direction D1. For simplification purposes, said drive means 6 are represented schematically and partially, in the form of a single roller depicted in dashed lines, only in FIG. 1.

In FIGS. 3 to 6, the device 1 is shown alone in order to better distinguish its constituent parts.

For purposes of reference in space, an orthogonal reference is defined comprising three perpendicular axes X1, Y1 and Z1. The device 1, the cable 2 and the pipe 3 extend along a longitudinal direction defined by the axis X1. A transverse direction is defined by the axis Y1. A direction radial to the pipe 3 is defined by the axis Z1. In the present text, the lengths are measured along the axis X1, the widths along the axis Y1, and the heights along the axis Z1.

Similarly, a plane P1 is defined comprising the axes X1 and Z1. The plane P1 constitutes a plane of symmetry of the device 1, the cable 2 and the pipe 3.

Finally, an upper side Cs, a lower side Ci, a front side Ca, a rear side Cr, a left side Cg and a right side Cd of the device 1 are defined.

The device 1 is a single piece of plastic material. Preferably, the device 1 is of polyurethane elastomer, as known under the Applicant's brand COURBHANE.

The device 1 comprises a base 10, a channel 20, a support surface 30, a passage 40, a front longitudinal extension 50, a ramp 60, a rear longitudinal extension 70, and a mounting plate 80.

Viewed from the top, the device 1 is in the form of a cross centered on the base 10. The cross comprises a foot composed of the extension 50, a tip composed of the extension 70, and two lateral branches comprised by the mounting plate 80.

The device 1 has a length L1. By way of example, said length L1 is on the order of 300 mm.

The base 10 is an irregular polyhedron having a length L10 and a height H10. The base 10 constitutes the largest part of the device 1. The height H10 constitutes the greatest height of the device 1. By way of example, the length L10 is on the order of 85 mm, while the height H10 is on the order of 65 mm.

The base 10 comprises two jaws 11, formed protruding on the upper side Cs, on each side Cg and Cd. The jaws 11 border the channel 20 on either side of the longitudinal axis X1. The jaws 11 constitute a clamp 12 provided to grip the cable 2. To that end, the clamp 12 encircles the axis X1 over an angular sector greater than 180 degrees, preferably greater than 200 degrees, for example 270 degrees in the example of the figures.

On each side Cg and Cd, the base 10 comprises a front ramp 13 and a rear ramp 14. Each of the lateral ramps 13 and 14 has a plane surface sloped from the top of the base 10 to the mounting plate 80. The front ramps 13 and the rear ramps 14 are separated by the passage 40. The ramps 13 are extended on the sides Cg and Cd, along the extension 50.

Also on each side Cg and Cd, the base 10 comprises a slot 15 open on the lower side Ci, in other words opening at the support surface 30. Each groove 15 passes through the ramps 13 and 14 along the longitudinal direction defined by the axis X1. The grooves 15 are provided to facilitate the deformation of the base 10 and of the mounting plate 80, so that the support surface 30 is pressed against the pipe 3 when the strap 4 is positioned through the passage 40 and tightened on the pipe 3.

The channel 20 is formed on the upper side Cs of the device 10 to receive the cable 2. The channel is centered over the axis X1. The channel 20 extends over the full length of the base 10 between the jaws 11. On either side of the base 10 along the axis X1, the channel 20 extends over part of the extension 50 and over part of the extension 70.

The support surface 30 is formed on the lower side Ci of the device 1, to rest against the pipe 3. The support surface 30 extends beneath the base 10, the extensions 50 and 70 and the mounting plate 80. Since the pipe 3 is cylindrical in the example of the figures, the support surface 30 is concave and has a cylindrical profile.

The transverse passage 40 is formed through the base 10 to allow the passage of the strap 4. Along the axis X1, the passage 40 is formed between the ramps 13 and 14, with a length L40 equal to about one third of the length L10. Along the axis Z1, the passage 40 is formed between the channel 20 and the support surface 30. The passage 40 is intended to receive the strap 4 to hold the device 1 against the pipe 3. More specifically, said strap 4 enables the base 10 to be pressed against the pipe 3.

The front longitudinal extension 50 is an irregular polyhedron having a length L50, a height H50 and a width W50. The extension 50 extends in the prolongation of the base 10 on the front side Ca. The extension 50 constitutes the most elongated part of the device 1.

According to the invention, the height H50 decreases overall moving away from the base 10 along the axis X1. Moreover, the length L50 is greater than the length L10, preferably at least twice as long. This configuration enables the drive means 6 to climb onto the extension 50 (generally by rolling, for example when the drive means 6 are rollers). The drive means 6 press on the extension 50 of the upper side Cs, while progressing along a direction D2 towards the base 10, opposite to the direction D1 of movement of the pipe 3. The drive means 6 then climb onto the base 10, while pressing onto the top of the base 10 and/or on the lateral ramps 13 and 14, without pushing back the base 10 of the rear side Cr. In comparison with a support device having no extension 50 and strap 5, the risk of breaking the strap 4 and of disengaging the device 1 is therefore greatly reduced.

In the example from the figures, the extension 50 comprises a first portion 51 which has a constant height H51 and a second portion 52 which has a height H52 decreasing overall moving away from the base 10 along the axis X1. The portion 52 has a length L52 greater than the length L51 of the portion 50.

The extension 50 comprises a transverse groove 55 formed on the upper side Cs of the portion 52. The groove 55 separates the portion 52 into two different zones, namely a zone of connection with the portion 51 and an end zone having a minimum height H50.

The groove 55 is intended to receive the second strap 5 to hold the device 1 against the pipe 3. More specifically, said strap 5 enables the extension 50 to be pressed against the pipe 3. The groove 55 facilitates the positioning of the strap 5 on the extension 50 and protects the strap 5 during passage of the rollers.

As a variant not represented and not preferred, the extension 50 may not have the groove 55. In this case, the strap 5 can be tightened directly onto the upper surface of the portion 52. According to another variant, not preferred, the device 1 can be secured to the pipe 3 only by means of the strap 4, without using a strap 5.

Figure 5:
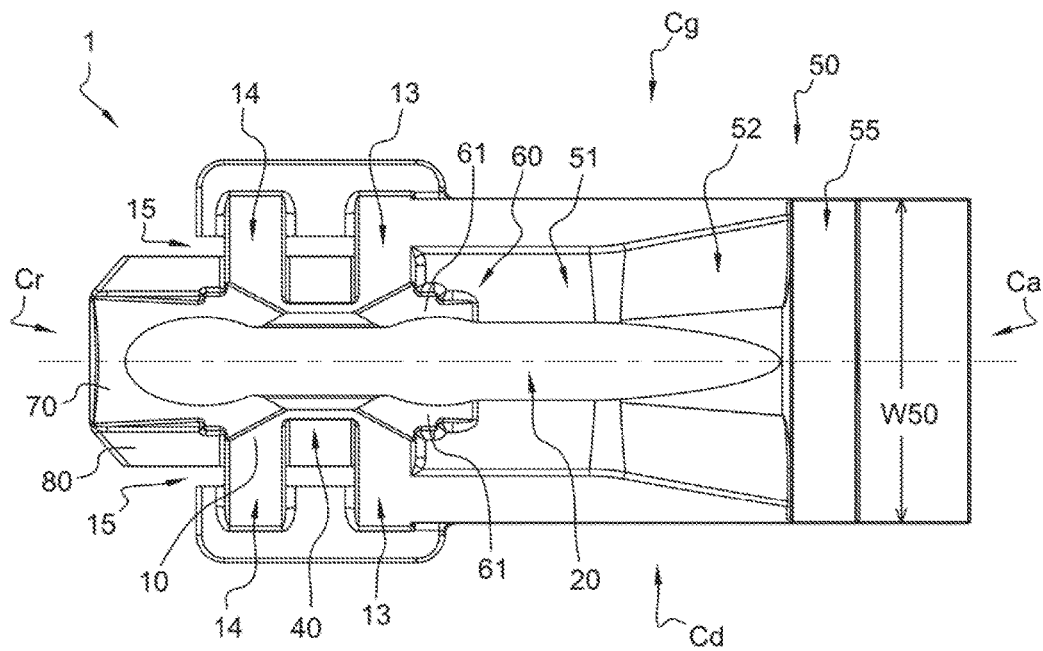
FIG. 5 is a top view of the device, along arrow V in FIG. 4.
Figure 6:
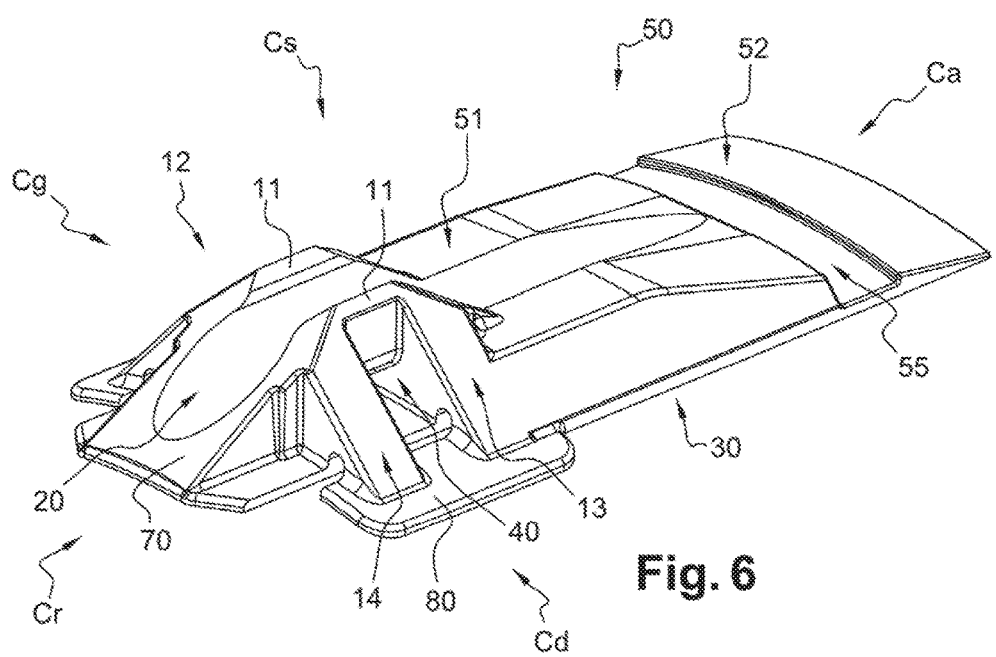
FIG. 6 is a view and perspective of the device.

As shown in FIG. 5, the channel 20 extends along the portion 51 and onto a part of the portion 52, up to the groove 55.

In the example of the figures, the width W50 is constant. As an alternative, the width W50 can vary moving away from the base 10.

By way of example, the length L50 is on the order of 235 mm, the width W50 is on the order of 170 mm, while the height H51 is on the order of 50 mm.

The sloped ramp 60 is formed from the upper side Cs of the device 1, between the base 10 and the extension 50. More specifically, the ramp 60 is composed of two flat surfaces 61 formed on either side of the channel 20, between the top of the base 10 and the portion 51 of the extension 50. The ramp 60 has a height H60 that increases from the portion 51 up to the top of the base 10. The presence of the ramp 60 facilitates the passage of the drive means 6 of the extension 50 at the base 10.

The rear longitudinal extension 70 is an irregular polyhedron having a length L70 and a height H70. The extension 70 extends in the prolongation of the base 10 on the rear side Cr. The height H70 decreases moving away from the base 10 opposite to the extension 50, along the axis X1. The extension 70 serves to guide the drive means 6, which descend back down from the base 10 along the direction D2. The length L70 is less than the length L50, and preferably less than the length L10.

The mounting plate 80 is formed to extend transversely on either side of the base 10 and of the extension 70. The mounting plate 80 delimits in part the support surface 30. The mounting plate 80 makes it possible to expand the area of the support surface 30, and therefore the area of the device 1 pressed against the pipe 3.

Figure 7:
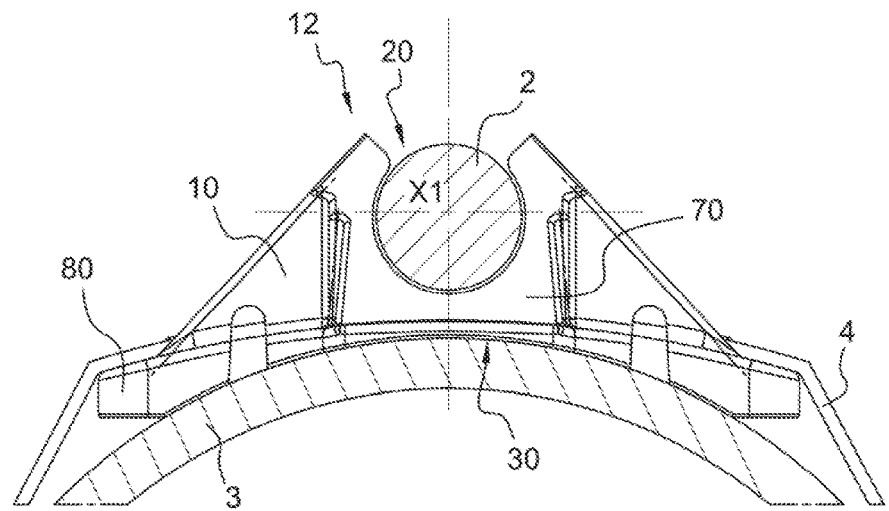
FIGS. 7 and 8 are views similar to FIGS. 1 and 2, for a device according to a second embodiment of the invention.
Figure 8:
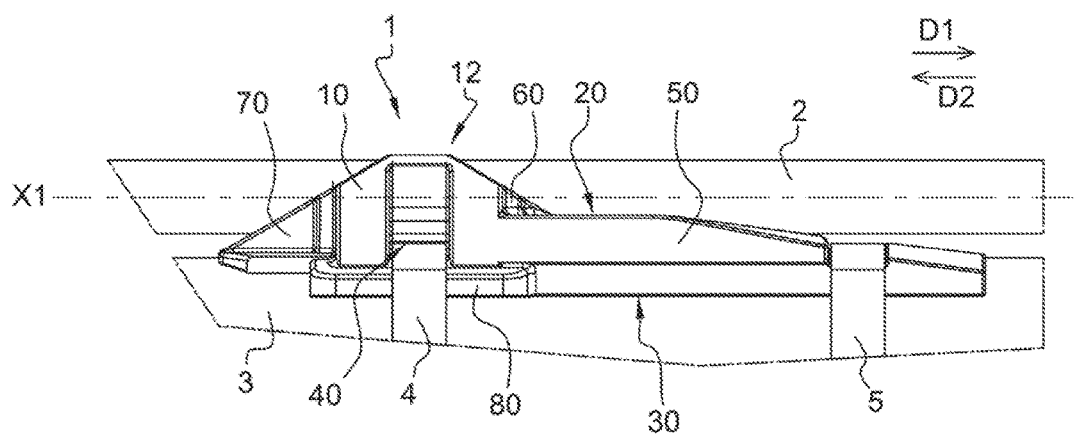

A second embodiment of the device 1 according to the invention is shown in FIGS. 7 and 8. Some constituent elements of said device 1 are comparable to those of the first embodiment described above, and for purposes of simplification, bear the same numerical references.

The pipe 3 has a diameter less than that of the first embodiment. For example, the pipe 3 has a diameter on the order of 340 mm. Thus, the concavity of the surface 30 is more pronounced. In addition, the mounting plate 80 has a greater height.

Moreover, the device 1 can be shaped differently from FIGS. 1 to 8 without going beyond the scope of the invention.

In a variant not shown, the device 1 can have different shapes and dimensions, to adapt to the shapes and dimensions of the cable 2 and of the pipe 3.

According to a variant not shown, the device 1 can be configured to support a plurality of cables 2. For example, the clamp 12 can be configured to receive a plurality of cables 2. Alternatively, the device 1 can comprise a plurality of clamps 12.

According to other variants not shown, the device 1 may not have a ramp 60, extension 70 and/or mounting plate 80.

Additionally, the technical characteristics of the various embodiments and variants mentioned above can be, in whole or for some of them, combined with each other. Thus, the device 1 can be adapted in terms of cost, functionalities and performance.

What is claimed is:

1. Device (1) designed to attach at least one cable (2) along a pipe (3), the device (1) comprising:
    a base (10) constituting a part of maximum height (H10) of the device (1);
    a channel (20) that extends along a longitudinal axis (X1) on an upper side (Cs) of the device (1) and which is intended to receive the cable (2);
    a support surface (30) which is formed on a lower side (Ci) of the device (1) and which is intended to rest against the pipe (3);
    two jaws (11) which are formed protruding from the base (10) on the upper side (Cs), which border the channel (20) on either side of the longitudinal axis (X1) and which constitute a clamp (12) provided to grip the cable (2); and
    a transverse passage (40) which is formed through the base (10), between the channel (20) and the support surface (30), and which is intended to receive an attachment member (4) to press the device (1) against the pipe (3);
    characterized in that the device (1) comprises a longitudinal extension (50) prolonging the base (10), more elongated than the base (10), and having a height (H50) decreasing overall moving away from the base (10) along the longitudinal axis (X1).

2. Device (1) according to claim 1, characterized in that the longitudinal extension (50) comprises a transverse groove (55) which is intended to receive a second member (5) for attachment of the device (1) against the pipe (3).

3. Device (1) according to claim 1, characterized in that the longitudinal extension (50) comprises a first portion (51) which has a constant height (H51) and a second portion (52) which has a height (H52) decreasing overall moving away from the base (10) along the longitudinal axis (X1).

4. Device (1) according to claim 1, characterized in that the longitudinal extension (50) has a length (L50) at least twice that of the length (L10) of the base (10).

5. Device (1) according to claim 1, characterized in that the channel (20) extends from the upper side (Cs) of the device (1) all along the base (10) and partially along the longitudinal extension (50).

6. Device (1) according to claim 1, characterized in that a sloped ramp (60) is formed on the upper side (Cs) of the device (1), between the base (10) and the longitudinal extension (50), on either side of the channel (20).

7. Device (1) according to claim 1, characterized in that a second longitudinal extension (70) prolongs the base (10) opposite to the longitudinal extension (50) and has a height (H70) decreasing overall moving away from the base (10) along the longitudinal axis (X1).

8. Device (1) according to claim 7, characterized in that a mounting plate (80) is formed that transversely extends past either side of the base (10) and partly defines the support surface (30), and in that the device (1) is cross-shaped comprising a foot composed of the longitudinal extension (50), a tip composed of the second longitudinal extension (70) and two lateral branches composed of the mounting plate (80).

9. Device (1) according to claim 1, characterized in that a mounting plate (80) is formed that transversely extends past either side of the base (10) and partly defines the support surface (30).

10. Method of implementing a device (1) according to claim 1, wherein the method comprises the following successive steps:
   a) attaching the device (1) to the pipe (3), using at least one attachment member (4; 4, 5); then
   b) progressively moving the pipe (3) along a first direction (D1) parallel to the longitudinal axis (X1) of the device (1) via rollers, pressing successively on the pipe (3), the longitudinal extension (50) and the base (10), then again on the pipe (3).

* * * * *